US012046102B2

(12) United States Patent
Fong

(10) Patent No.: US 12,046,102 B2
(45) Date of Patent: Jul. 23, 2024

(54) GAMING SYSTEM AND A METHOD OF GAMING

(71) Applicant: Aristocrat Technologies Australia Pty Limited, North Ryde (AU)

(72) Inventor: Colin Fong, Penshurst (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/114,829

(22) Filed: Feb. 27, 2023

(65) Prior Publication Data

US 2023/0206716 A1 Jun. 29, 2023

Related U.S. Application Data

(63) Continuation of application No. 17/386,858, filed on Jul. 28, 2021, now Pat. No. 11,600,135, which is a
(Continued)

(30) Foreign Application Priority Data

Sep. 12, 2007 (AU) ................................ 2007904958

(51) Int. Cl.
*G07F 17/32* (2006.01)
*G07F 17/34* (2006.01)

(52) U.S. Cl.
CPC ...... *G07F 17/3213* (2013.01); *G07F 17/3225* (2013.01); *G07F 17/3244* (2013.01); *G07F 17/34* (2013.01)

(58) Field of Classification Search
CPC ......................... G07F 17/3213; G07F 17/3243
See application file for complete search history.

(56) References Cited

U.S. PATENT DOCUMENTS

| | | | |
|---|---|---|---|
| 5,211,399 | A | 5/1993 | Howard |
| RE35,182 | E | 3/1996 | Howard |

(Continued)

FOREIGN PATENT DOCUMENTS

| | | |
|---|---|---|
| AU | 2007203053 | 3/2008 |
| CA | 2528267 | 5/2007 |

(Continued)

OTHER PUBLICATIONS

Examination report No. 1 for Australian Application No. 2018203412, dated May 30, 2019.

(Continued)

*Primary Examiner* — James S. McClellan
(74) *Attorney, Agent, or Firm* — McAndrews, Held & Malloy, Ltd.

(57) ABSTRACT

A gaming method and system, the method comprising providing one or more reels in a spinning reel game, the reels being displayed as three dimensional and displayed as provided with game symbols along and around the reels, displaying spinning of the reels and thereby sequentially displaying at least some of the game symbols displayed as provided along the reels, displaying rotating of the reels and thereby sequentially displaying at least some of the game symbols displayed as provided around the reels, stopping the spinning and the rotating of each of the reels at a respective stop position, and determining a game outcome based on at least some of the game symbols displayed when each of the reels is in its respective stop position.

19 Claims, 9 Drawing Sheets

Related U.S. Application Data continuation of application No. 16/438,390, filed on Jun. 11, 2019, now Pat. No. 11,094,160, which is a continuation of application No. 15/251,722, filed on Aug. 30, 2016, now Pat. No. 10,325,444, which is a continuation of application No. 13/732,973, filed on Jan. 2, 2013, now Pat. No. 9,430,911, which is a continuation of application No. 12/208,673, filed on Sep. 11, 2008, now Pat. No. 8,366,536.

(56) References Cited

U.S. PATENT DOCUMENTS

| | | | |
|---|---|---|---|
| 5,688,172 | A | 11/1997 | Lorenzo Regidor |
| 6,715,756 | B2 | 4/2004 | Inoue |
| 7,252,591 | B2 | 8/2007 | Van Asdale |
| 7,255,641 | B1 | 8/2007 | Atkinson |
| 7,371,172 | B2 | 5/2008 | Inoue |
| 7,717,790 | B2 | 5/2010 | Shimizu |
| 8,366,536 | B2 | 2/2013 | Fong |
| 9,430,911 | B2 | 8/2016 | Fong |
| 9,940,795 | B2 | 4/2018 | Van Linden |
| 2003/0064781 | A1 | 4/2003 | Muir |
| 2004/0038724 | A1 | 2/2004 | Asdale |
| 2004/0077402 | A1 | 4/2004 | Schlottmann |
| 2004/0102238 | A1 | 5/2004 | Taylor |
| 2004/0102244 | A1 | 5/2004 | Kryuchkov |
| 2004/0152502 | A1 | 8/2004 | Okada |
| 2004/0235558 | A1 | 11/2004 | Beaulieu |
| 2004/0256799 | A1 | 12/2004 | Omomo |
| 2005/0026678 | A1 | 2/2005 | Kaminkow |
| 2006/0052152 | A1 | 3/2006 | Tedsen |
| 2006/0084498 | A1 | 4/2006 | Baerlocher |
| 2006/0160603 | A1 | 7/2006 | Lulek |
| 2006/0189378 | A1 | 8/2006 | Aoki |
| 2007/0054727 | A1 | 3/2007 | Garamendi |
| 2008/0032774 | A1 | 2/2008 | Yoshizawa |
| 2008/0045298 | A1 | 2/2008 | Yoshizawa |
| 2008/0090636 | A1 | 4/2008 | Lathrop |
| 2008/0182647 | A1 | 7/2008 | Brunet De Courssou |

FOREIGN PATENT DOCUMENTS

| | | |
|---|---|---|
| EP | 0065404 | 11/1982 |
| EP | 0086298 | 8/1983 |
| EP | 1184822 | 3/2002 |
| EP | 1363253 | 11/2003 |
| EP | 1437698 | 7/2004 |
| EP | 1522974 | 4/2005 |
| GB | 1471866 | 4/1977 |
| GB | 2112984 | 7/1983 |
| GB | 2182478 | 5/1987 |
| GB | 2247970 | 3/1992 |
| GB | 2419998 | 5/2006 |
| WO | 03002223 | 1/2003 |
| WO | 2004029893 | 4/2004 |
| WO | 2006039324 | 4/2006 |
| WO | 2007032878 | 3/2007 |

OTHER PUBLICATIONS

Office Action dated Oct. 28, 2020 for U.S. Appl. No. 16/438,390 (pp. 1-7).

Office Action dated Mar. 4, 2021 for U.S. Appl. No. 16/438,390 (pp. 1-7).

Notice of Allowance dated May 11, 2021 for U.S. Appl. No. 16/438,390 (pp. 1-5).

Office Action (Notice of Allowance and Fees Due (PTOL-85)) dated Nov. 9, 2022 for U.S. Appl. No. 17/386,858 (pp. 1-7).

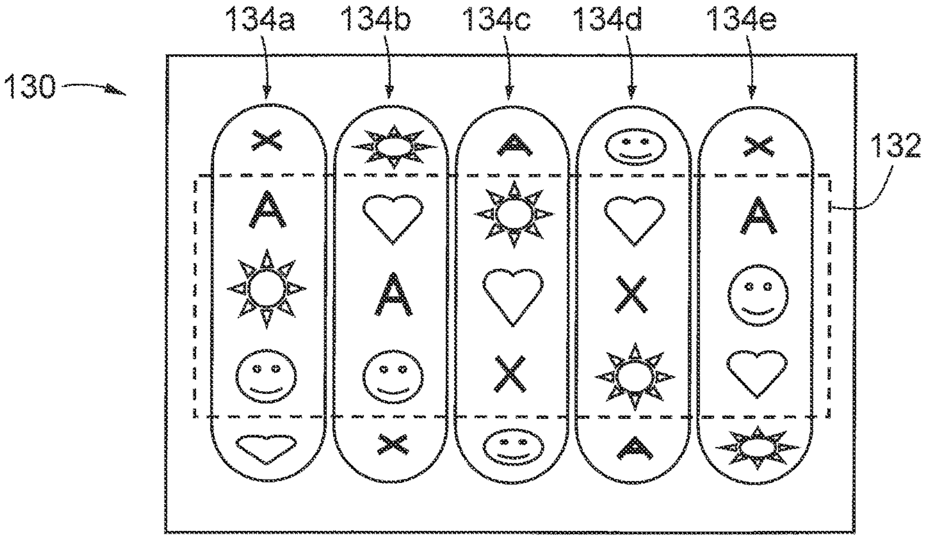
Figure 9B
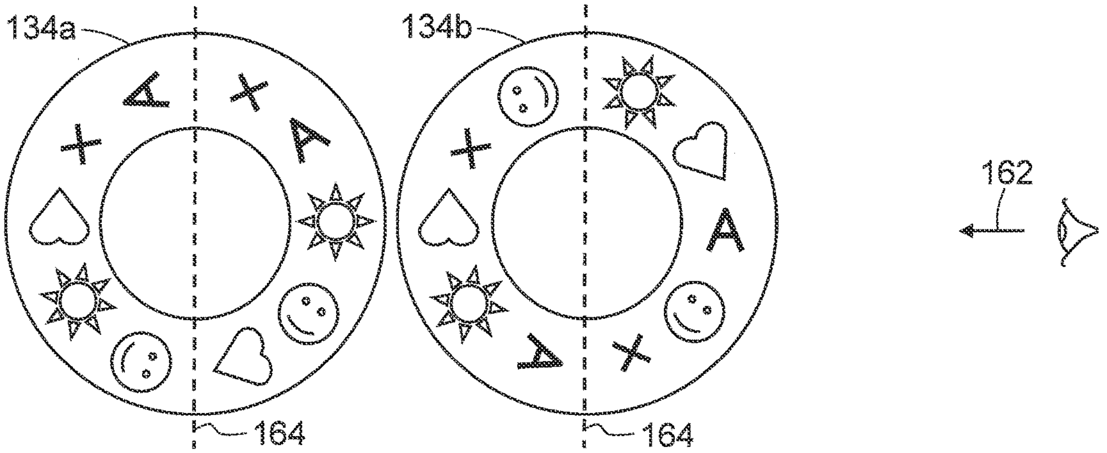
Figure 10A
Figure 10B
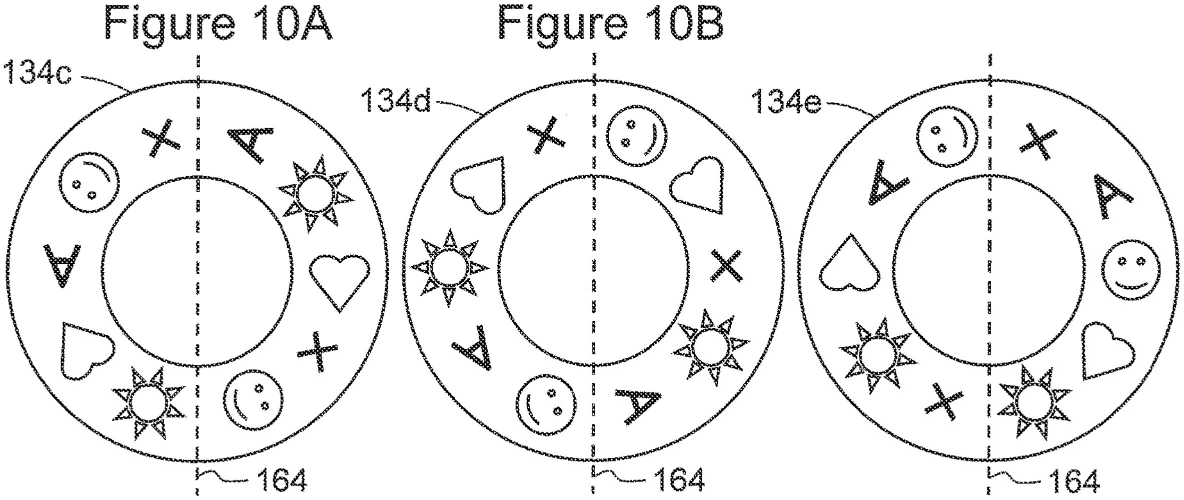
Figure 10C
Figure 10D
Figure 10E

GAMING SYSTEM AND A METHOD OF GAMING

RELATED APPLICATIONS

The present application is a continuation of and claims priority to U.S. patent application Ser. No. 17/386,858, filed Jul. 28, 2021, which is a continuation of U.S. patent application Ser. No. 16/438,390 filed Jun. 11, 2019, (now U.S. Pat. No. 11,094,160, issued on Aug. 17, 2021) which is a continuation of U.S. patent application Ser. No. 15/251,722 filed Aug. 30, 2016, (now U.S. Pat. No. 10,325,444, issued on Jun. 18, 2019), which is a continuation of U.S. patent application Ser. No. 13/732,973 filed Jan. 2, 2013 (now U.S. Pat. No. 9,430,911, issued on Aug. 30, 2016), which is a continuation of U.S. patent application Ser. No. 12/208,673 filed Sep. 11, 2008 (now U.S. Pat. No. 8,366,536, issued on May 2, 2013), which claims priority to Australian Provisional Patent Application No. 2007904958 filed Sep. 12, 2007, which are incorporated herein by reference in their entireties.

FIELD

The present invention relates to a gaming system, a method of gaming, a game controller and computer program code.

BACKGROUND

It is known to provide a gaming system which comprises a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a video display.

While such gaming systems provide users with enjoyment, a need exists for alternative gaming systems in order to maintain or increase player enjoyment.

SUMMARY

In accordance with a first aspect of the present invention, there is provided a method of gaming comprising: providing one or more reels in a spinning reel game, the reels being displayed as three dimensional and displayed as provided with game symbols along and around the reels; displaying spinning of the reels and thereby sequentially displaying at least some of the game symbols displayed as provided along the reels; displaying rotating of the reels and thereby sequentially displaying at least some of the game symbols displayed as provided around the reels; stopping the spinning and the rotating of each of the reels at a respective stop position; and determining a game outcome based on at least some of the game symbols displayed when each of the reels is in its respective stop position.

In one particular embodiment, the method includes displaying the reels as toruses.

Thus, one or more spinning reels are provided that both spin and rotate. It should be understood that, herein, the term "spin" refers to the motion of a reel that is typically observed in spinning reel games of the background art, whereas "rotate" refers to the motion of a toroidal reel whereby an outer surface of a reel progressively becomes an inner face and vice versa (as is further explained below).

In one particular embodiment, the method includes displaying the reels as provided with game symbols inside the reels.

In one embodiment, the method includes displaying the reels as spinning from top to bottom. This motion is comparable to the motion of spinning reels in spinning reels games of the background art. The reels can be displayed to spin at different speeds, displayed to rotate at different speeds, or both.

In a certain embodiment, the method includes displaying the reels as rotating from left to right or from right to left. This motion would therefore commonly be—or appear to a player to be—perpendicular to the top to bottom spinning of a reel. Combined, it should be noted, spinning from top to bottom and rotating from left to right or from right to left may create the illusion that game symbols are moving somewhat diagonally.

In one embodiment, the method includes providing the spinning reels with circular cross sections, that is, that the spinning reels are shaped like doughnuts.

In one embodiment, the method includes providing the spinning reels with polygonal cross sections (such as square (e.g., 182*e* as shown in FIG. 13A), triangular, pentagonal and hexagonal cross sections).

In one embodiment, the method includes stopping the reels from rotating before stopping the reels from spinning.

In a particular embodiment, the method includes stopping the reels from rotating or spinning temporarily during a game. During such a temporary stop, the reels may in effect change their direction of rotation or spin.

The method may include displaying nudging of the reels, whether from top to bottom (or vice versa), left to right (or vice versa) or any combination of these directions.

Thus, nudging—and other reel movements—can be implemented according to this aspect of the invention. The nudging can be vertical or horizontal or in a combination of directions, owing to the ability of the reels to rotate as well as spin. The eligibility of a player to nudge one or more reels may follow known criteria, such as by purchasing a nudge, only when certain symbol combinations are displayed, only in features, only for special players, etc. Nudges may be made available on a restricted basis (such as in one direction only) or a more extensive basis (up to four directions), accordingly. The instigation of the nudge may be either automatic or by player instruction. As nudge may be available in both horizontal (i.e. rotational) or vertical (i.e. spin) directions, additional button functions may be provided so that a player can place the precise nudge instruction desired, including—where desired or permitted—simultaneously horizontally and vertically.

The method may include displaying one or more of the game symbols as held symbols, or one or more of the reels as held reels. The method may include providing a hold and spin feature, whereby a player can arrest one or more reels (from spinning, rotating or both) and allow the remaining reels to move (spinning, rotating or both).

In certain embodiments, the method may include displaying the reels as transparent or partially transparent.

The method may include displaying one or more additional game symbols, such as within one or more of the reels. The method may include displaying the additional game symbols on respective objects (such as balls), as separate objects, or on one or more additional reels (which may be displayed, for example, behind or within the reels, or—in some cases—nested within each other). The additional game symbols may be displayed as moving within, outside, or through the reels, or combinations of these, including from being associated with (such as inside) one of the reels to being associated with (such as inside) another of the reels.

The additional reels may be strips (i.e. two dimensional) or three dimensional, and both two dimensional reels and three dimensional additional reels may be displayed successively or simultaneously. Both two and three dimensional additional reels may be displayed as rotating as well as spinning. The reels and the additional reels may move simultaneously or separately, and some additional reels may move separately from other additional reels. Additional reel creation, activation or control may be according to predefined rules, in response to player intervention, or both.

In some embodiments, some or all of the reels are displayed as compound reels, each comprising an inner two- or three-dimensional reel and an outer at least partially transparent three-dimensional reel, all provided with game symbols. The inner reel (or reels) may spin and the outer reel (or reels) rotate, or vice versa. For example, in one embodiment the method includes displaying each of the reels as a compound reel comprising an inner three-dimensional reel displayed as provided with game symbols and an outer partially transparent three-dimensional reel displayed as provided with game symbols, at least some of the game symbols provided on the inner reel visible through the outer reel, the method including displaying spinning of the outer reel and rotating of the inner reel (or vice versa).

The method may include displaying one or more of the reels as altering in shape. In such embodiments, the method may include displaying the number or distribution of the game symbols as altering. For example, one or more of the reels may be displayed as being transformed such that a 5□3 matrix of game symbols (i.e. 5 symbols along a reel and 3 symbols around a reel are contained within a player viewable window) are transformed into a 5□4 matrix of game symbols.

In accordance with a second aspect of the present invention, there is provided a game controller for a gaming system, the game controller arranged to: provide one or more reels in a spinning reel game, the reels being displayed as three dimensional and displayed as provided with game symbols along and around the reels; display spinning of the reels and thereby sequentially display at least some of the game symbols displayed as provided along the reels; display rotating of the reels and thereby sequentially display at least some of the game symbols displayed as provided around the reels; stop the spinning and the rotating of each of the reels at a respective stop position; and determine a game outcome based on at least some of the game symbols displayed when each of the reels is in its respective stop position.

In one particular embodiment, the game controller is arranged to display the reels as toruses.

In one embodiment, the game controller is arranged to display the reels as spinning from top to bottom, and to display the reels as rotating from left to right, from right to left or from left to right and from right to left.

In one embodiment, the game controller is arranged to stop the reels from rotating before stopping the reels from spinning.

In accordance with a third aspect of the present invention, there is provided a gaming system comprising: a player interface comprising a display for displaying game outcomes to a player; and a game controller arranged to: provide one or more reels in a spinning reel game, the reels being displayed as three dimensional and displayed as provided with game symbols along and around the reels; display spinning of the reels and thereby sequentially display at least some of the game symbols displayed as provided along the reels; display rotating of the reels and thereby sequentially display at least some of the game symbols displayed as provided around the reels; stop the spinning and the rotating of each of the reels at a respective stop position; and determine a game outcome based on at least some of the game symbols displayed when each of the reels is in its respective stop position.

The invention also provides computer program code that when executed by a processor implements the method described above. The invention also provides a computer readable medium comprising that program code.

In addition, the invention provides a data packet or packets comprising computer program code that when executed by a processor implements the method described above.

BRIEF DESCRIPTION OF THE DRAWINGS

In order that the invention may be more clearly ascertained, embodiments will now be described, by way of example, with reference to the accompanying drawings.

FIGS. 9A and 9B are views of the visual display of FIG. 6 with the reels while and following rotation, respectively.

FIGS. 10A to 10E are lateral views of the reels of the visual display of FIG. 6.

DETAILED DESCRIPTION

According to embodiments of the invention there is provided a gaming system in which a player plays a spinning reel type game or games. An award is determined for the game or games. The reels spin about an axis in a conventional manner to display a sequence of symbols and in due course may form a winning pattern (such as a win line). According to embodiments of the present invention, the reels are each of apparent three-dimensional, torus form. In one example, the torus has a circular cross section, and in another example a square cross section. It will be appreciated, however, that essentially any cross section can be used provided it is suitable for displaying the symbols.

The gaming system may be provided in a number of different forms.

In a first form, a stand-alone gaming machine is provided in which all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
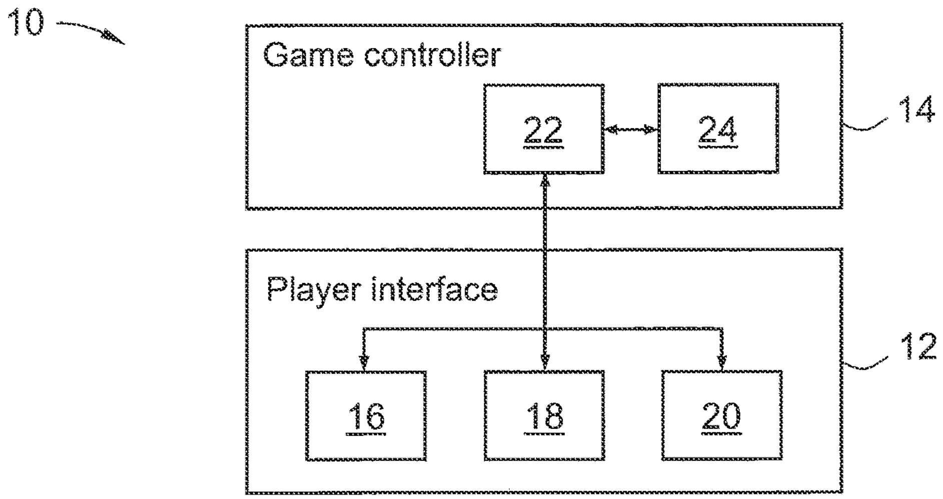
FIG. 1 is a block diagram of the core components of a gaming system according to an embodiment of the invention.

Irrespective of the form, the gaming system comprises several core components. Referring to FIG. 1, at the broadest level the core components are a player interface 12 and a game controller 14, as illustrated schematically at 10 in FIG. 1.

Player interface 12 is arranged to enable manual interaction between a player and the gaming system and for this purpose includes the input/output components required for the player to enter instructions and play the game. Components of the player interface may vary from embodiment to embodiment but will typically include a credit mechanism 16 to enable a player to input credits and receive payouts, one or more displays 18 and a game play mechanism 20 that enables a player to input game play instructions.

Game controller 14 is in data communication with the player interface and typically includes a processor 22 that processes the game play instructions in accordance with game play rules and outputs game play outcomes to the display. Typically, the game play instructions are stored as program code in a memory 24 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
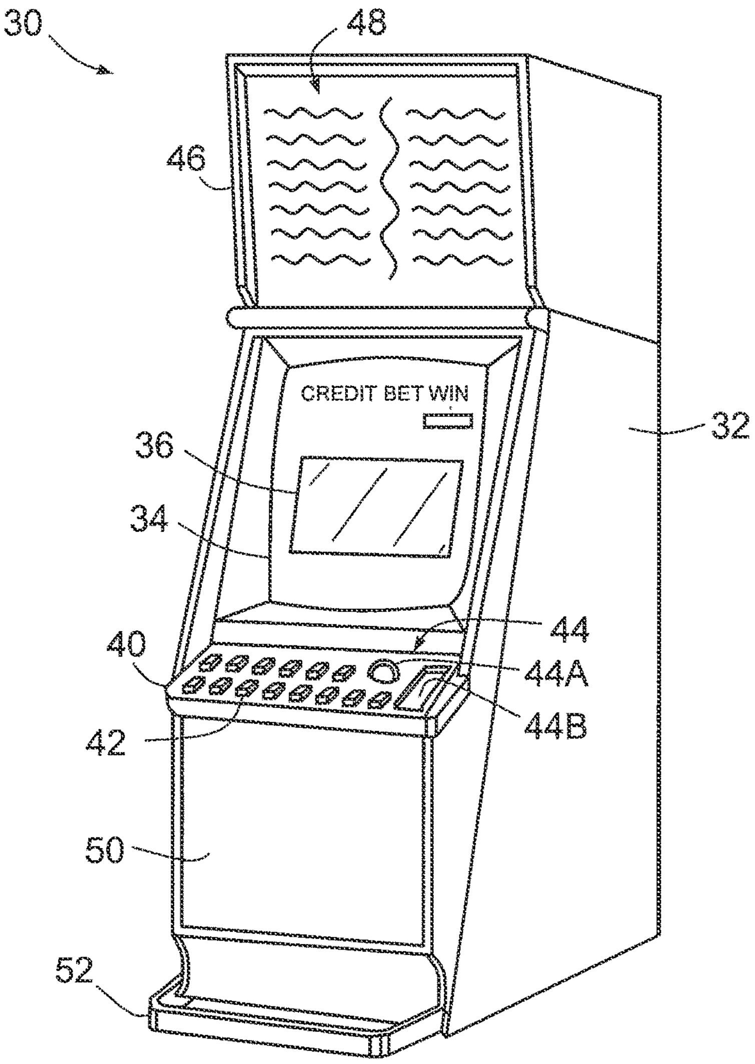
FIG. 2 is a perspective view of a gaming machine according to an embodiment of the invention.

A gaming system in the form of a stand alone gaming machine 30 according to another embodiment of the invention is shown schematically at 30 in FIG. 2. Gaming machine 30 includes a console 32 having a display 34 on which is displayed representations of a game 36 that can be played by a player. A mid-trim 40 of the gaming machine 30 houses a bank of buttons 42 for enabling a player to interact with the gaming machine, in particular during game play. The mid-trim 40 also houses a credit input mechanism 44 that, in this example, includes a coin input chute 44A and a bill collector 44B. Other credit input mechanisms may also be employed, such as a card reader for reading a smart card, debit card or credit card. A player marketing module having a reading device may also be provided for the purpose of reading a player tracking device, for example as part of a loyalty program. The player tracking device may be in the form of a card, flash drive or any other portable storage medium capable of being read by the reading device.

A top box 46 may carry artwork 48 including, for example, pay tables and details of bonus awards and other information or images relating to the game. Further artwork and/or information may be provided on a front panel 50 of the console 32. A coin tray 52 is mounted beneath the front panel 50 for dispensing cash payouts from the gaming machine 30.

Display 34 of gaming machine 30 is in the form of a video display unit, particularly a cathode ray tube screen device. Alternatively, the display 34 may be a liquid crystal display, plasma screen, any other suitable video display unit, or the visible portion of an electromechanical device. The top box 46 may also include a display, such as a video display unit, which may be of the same type as the display 34, or of a different type.

Figure 3:
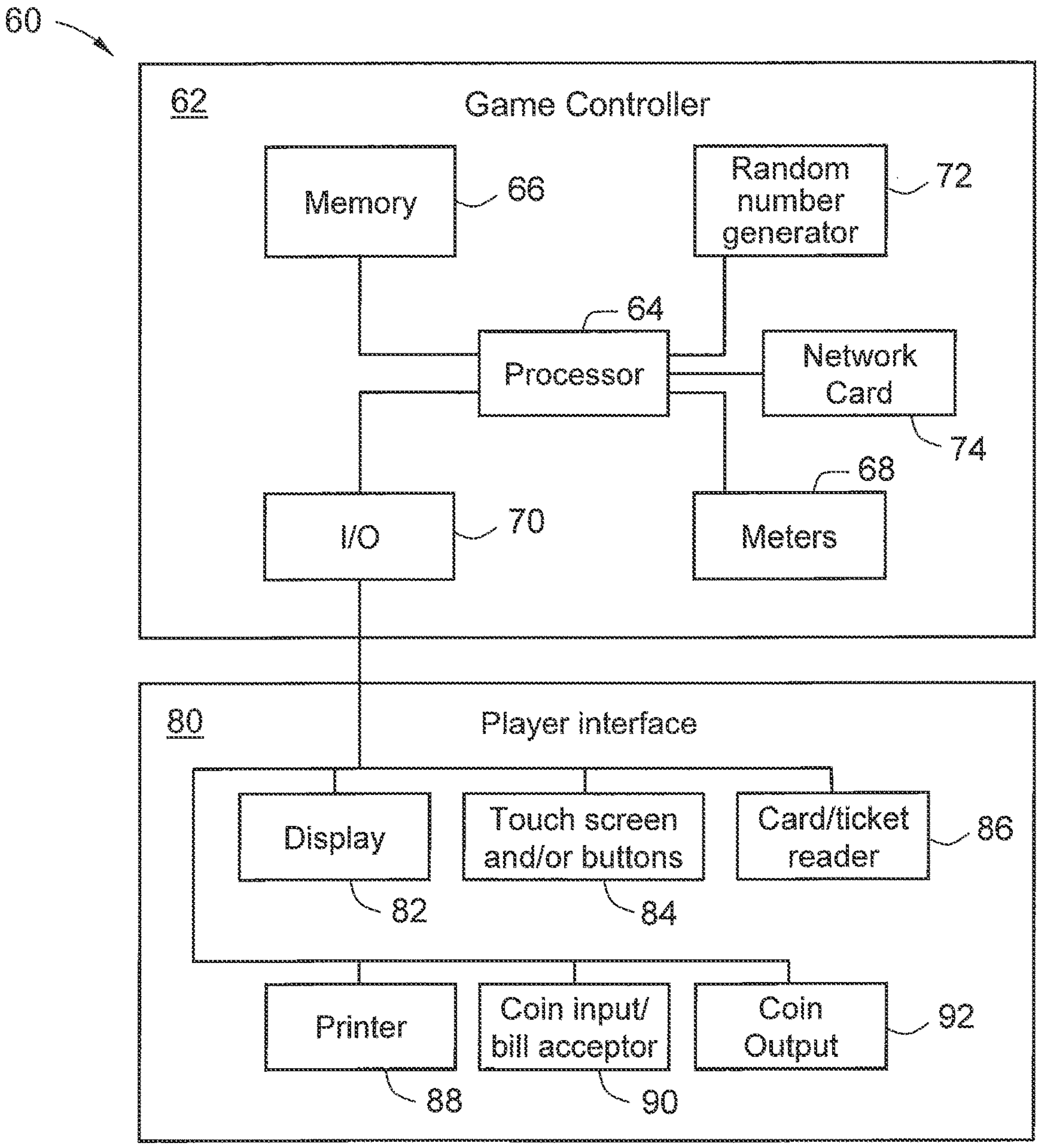
FIG. 3 is a block diagram of the functional components of a gaming machine according to an embodiment of the invention.

FIG. 3 is a schematic block diagram of a typical gaming machine 60 according to the present invention, in which only the operative components are shown for clarity. Gaming machine 60 may be the same as or different from gaming machine 30 of FIG. 2. Gaming machine 60 includes a game controller 62 having a processor 64. Instructions and data to control operation of processor 64 are stored in a memory 66, which is in data communication with processor 64. Typically, gaming machine 60 includes both volatile and non-volatile memory and more than one of each type of memory, with such memories being collectively represented by memory 66.

Gaming machine 60 has hardware meters 68 for purposes including ensuring regulatory compliance and monitoring player credit, and an input/output (I/O) interface 70 for communicating with peripheral devices of gaming machine 60. Input/output interface 70, the peripheral devices or both may be intelligent devices with their own memory for storing associated instructions and data for use with the input/output interface 70 or the peripheral devices.

Gaming machine 60 also includes a random number generator module 72 generates random numbers for use by the processor 64. Persons skilled in the art will appreciate that the reference to random numbers includes pseudo-random numbers.

In addition, gaming machine 60 may include a communications interface, for example a network card 74. Network card 74 may, for example, send status information, accounting information or other information to a central controller, server or database and receive data or commands from the central controller, server or database.

In the example shown in FIG. 3, gaming machine 60 includes a player interface 80 that includes peripheral devices that communicate with game controller 62. These peripheral devices comprise one or more displays 82, a touch screen and/or buttons 84, a card and/or ticket reader 86, a printer 88, a bill acceptor and/or coin input mechanism 90 and a coin output mechanism 92. Additional hardware may be included as part of the gaming machine 60, or hardware may be omitted as required for the specific implementation.

Figure 4:
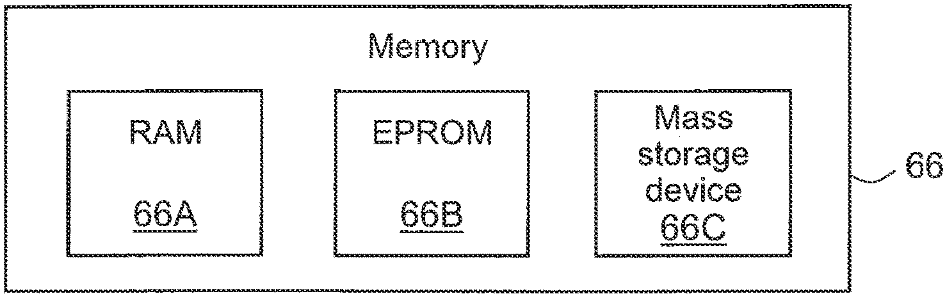
FIG. 4 is a block diagram representing the structure of a memory according to an embodiment of the invention.

FIG. 4 shows a block diagram of the main components of an exemplary memory 66. Memory 66 includes RAM 66A, EPROM 66B and a mass storage device 66C. RAM 66A typically temporarily holds program files for execution by the processor 64 and related data. EPROM 66B may be a boot ROM device and/or may contain some system or game related code. Mass storage device 66C is typically used to store game programs, the integrity of which may be verified and/or authenticated by processor 64 using protected code from EPROM 66B or elsewhere.

It is also possible for the operative components of the gaming machine 60 to be distributed; for example, input/output devices 82, 84, 86, 88, 90, 92 may be provided remotely from game controller 62.

Figure 5:
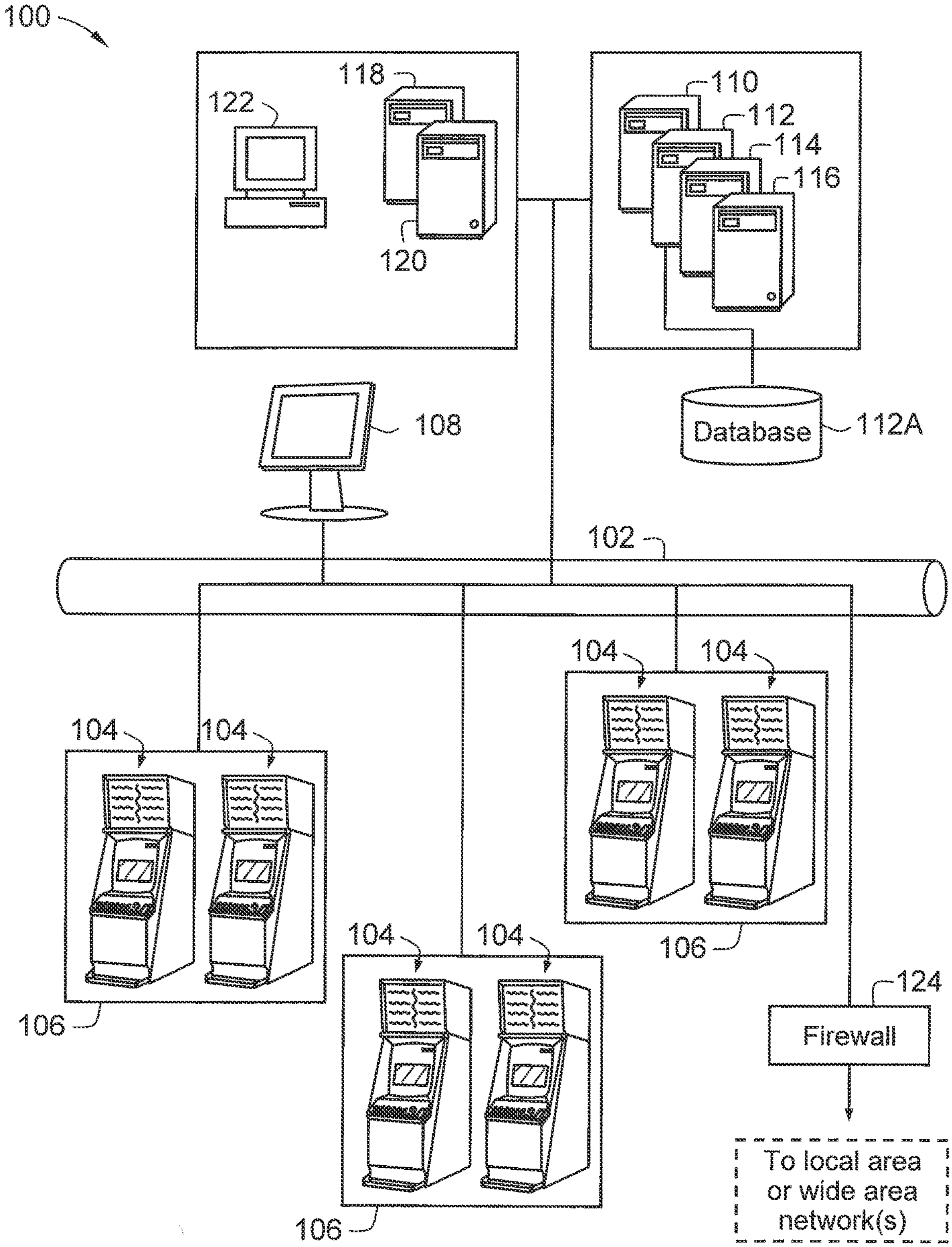
FIG. 5 is a diagram schematic of a networked gaming system according to an embodiment of the invention.

FIG. 5 shows a gaming system 100 in accordance with an alternative embodiment. Gaming system 100 includes a network 102 that may be, for example, an Ethernet network. Gaming machines 104, shown arranged in three banks 106 of two gaming machines 104 in FIG. 5, are connected to the network 102. Gaming machines 104 provide a player operable interface and may be the same as gaming machines 30, 60 shown in FIGS. 2 and 3, or may have simplified functionality depending on the requirements for implementing game play. While banks 106 of two gaming machines are illustrated in FIG. 5, banks of one, three or more gaming machines are also envisaged.

One or more displays 108 may also be connected to the network 102. Displays 108 may, for example, be associated with one or more banks 106 of gaming machines. Displays 108 may be used to display representations associated with game play on gaming machines 104, to display other representations, such as promotional or informational material, or both.

In a thick client embodiment, game server 110 of gaming system 100 implements part of the game played by a player using a gaming machine 104 and gaming machine 104 implements part of the game. With this embodiment, as both the game server and the gaming machine implement part of the game, they collectively provide a game controller. A database management server 112 may manage storage of game programs and associated data for downloading or access by the gaming devices 104 in a database 112A. Typically, if the gaming system enables players to participate in a Jackpot game, a Jackpot server 114 will be provided to carry out the accounting in respect of the Jackpot game. A loyalty program server 116 may also be provided.

In a thin client embodiment, game server 110 implements most or all of the game played by a player using a gaming machine 104 and gaming machine 104 essentially provides only the player interface. With this embodiment, game server 110 provides the game controller. Gaming machine 104 receives player instructions, passes these to game server 110, which then processes them and returns game play outcomes to gaming machine 104 for display. In a thin client embodiment, gaming machines 104 may be computer terminals, such as PCs running software that provides a player interface operable using standard computer input and output components.

Servers are also typically provided to assist in the administration of gaming system 100 including, for example, a gaming floor management server 118, and a licensing server 120 to monitor the use of licenses relating to particular games. An administrator terminal 122 is provided to allow an administrator to run network 102 and the devices connected to the network.

Gaming system 100 may communicate with other gaming systems, with other local networks such as a corporate network, with a wide area network such as the Internet, for example through a firewall 124, or a combination of these.

Persons skilled in the art will appreciate that, in accordance with known techniques, functionality at the server side of gaming system 100 may be distributed over a plurality of different computers. For example, elements may be run as a single "engine" on one server or a separate server may be provided. For example, game server 110 could run a random generator engine. Alternatively, a separate random number generator server could be provided. Further, persons skilled in the art will appreciate that a plurality of games servers could be provided to run different games or a single game server may run a plurality of different games as required by the terminals.

As discussed above, embodiments are provided according to the present invention that are implemented in relation to a spinning reel type game, the gaming systems for implementing these games having a video display. According to these embodiments, the reels of the spinning reel type games are each of three-dimensional, torus form. An example of such a video display with exemplary reels according to one embodiment of the invention is shown schematically at 130 in FIG. 6. Video display 130 has a viewable region 132 in which are displayed portions of five reels 134*a*, 134*b*, 134*c*, 134*d*, 134*e*. Reels 134*a*, 134*b*, 134*c*, 134*d*, 134*e* are displayed as toroidal with circular cross-sections, and hence doughnut-shaped; this can be done by shading or otherwise rendering the reels appropriately. For example, viewable region 132 may be enlarged so that upper and lower peripheries 136*a*, 136*b* of reels 134*a*, 134*b*, 134*c*, 134*d*, 134*e* are shown as curved. In addition, game symbols visible along reels 134*a*, 134*b*, 134*c*, 134*d*, 134*e* are progressively foreshortened towards upper and lower peripheries 136*a*, 136*b*, consistent with the toroidal form of the reels. Reels 134*a*, 134*b*, 134*c*, 134*d*, 134*e* are displayed to appear to spin from top to bottom during game play.

Figure 7:
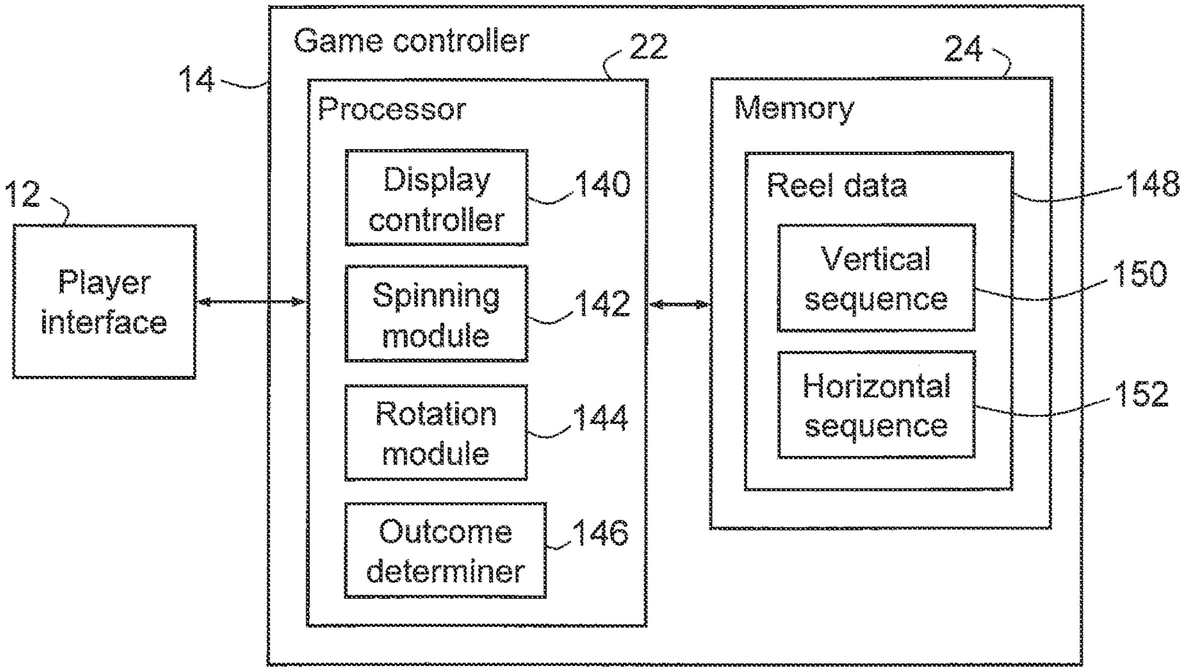
FIG. 7 is another view of the core components of the gaming system of FIG. 1, according to an embodiment of the invention.

FIG. 7 is another schematic view of the player interface 12 and a game controller 14 of FIG. 1, with more detail shown in the game controller 14. Specifically, processor 12 of game controller 14 includes a display controller 140, a spinning module 142 and a rotation module 144. The display controller 140 controls the view that is displayed on displays 34, 82; spinning module 142 controls the manner in which reels 134*a*, 134*b*, 134*c*, 134*d*, 134*e* are displayed when displayed to spin and rotation module 144 controls the manner in which reels 134*a*, 134*b*, 134*c*, 134*d*, 134*e* are displayed when displayed to rotate. Processor 12 also includes an outcome determiner 146 (typically receiving input from the random number generator), for determining game outcomes. Display controller 140, spinning module 142, rotation module 144 and outcome determiner 146 cooperate to display and determine the outcome of a game.

In addition, memory 24 includes reel data 148 comprising vertical sequence data 150 and horizontal sequence data 152. Vertical sequence data 150 is indicative of the sequence in which game symbols are to be displayed along each of reels 134*a*, 134*b*, 134*c*, 134*d*, 134*e* and horizontal sequence data 152 is indicative of the sequence in which game symbols are to be displayed around each of reels 134*a*, 134*b*, 134*c*, 134*d*, 134*e*. This can be encoded in any convenient way; for example, vertical sequence data 150 can indicate, for each of reels 134*a*, 134*b*, 134*c*, 134*d*, 134*e*, four sequences of game symbols with horizontal sequence data 152 indicating where each of the vertical sequences should commence. Alternatively, vertical sequence data 150 can indicate, for each of reels 134*a*, 134*b*, 134*c*, 134*d*, 134*e*, one sequence of game symbols to be displayed along the respective reel, with horizontal sequence data 152 indicating the sequence of game symbols to be displayed around each reel from each of the game symbols indicated in by the vertical sequence data 150.

Although in this embodiment reels 134*a*, 134*b*, 134*c*, 134*d*, 134*e* are displayed as toroidal with circular cross sections, in other embodiments, the reels may be displayed with other shapes such as toroidal with square cross-sections. Such an embodiment is shown schematically in FIG. 8, which depicts a video display 160 in which are displayed reels 134*a*', 134*b*', 134*c*', 134*d*', 134*e*'. These reels spin in the same manner as do reels 134*a*, 134*b*, 134*c*, 134*d*, 134*e* of FIG. 6, and carry essentially the same game symbols.

Referring to FIG. 7, game play instructions stored in memory 24 control reels 134*a*, 134*b*, 134*c*, 134*d*, 134*e* to be displayed to spin such that game symbols arranged along reels 134*a*, 134*b*, 134*c*, 134*d*, 134*e* are displayed as moving downwards in the viewable region 132.

Figure 6:
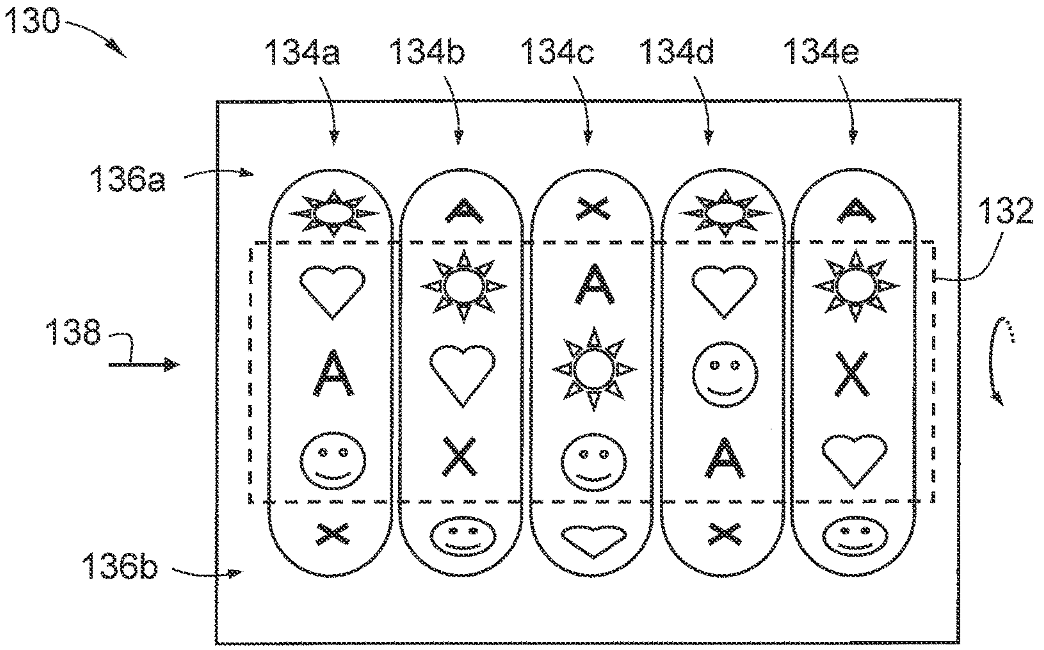
FIG. 6 is a schematic diagram of the visual display of a gaming system according to an embodiment of the invention, with three dimensional reels of toroidal form and circular cross section.

Reels 134*a*, 134*b*, 134*c*, 134*d*, 134*e* also have game symbols located around their three dimensional surfaces, such that four game symbols correspond to each symbol position along any reel; hence, in the stopped configuration shown in FIG. 6, three additional game symbols are concealed or otherwise not displayed for each displayed game symbol. Thus, reels 134*a*, 134*b*, 134*c*, 134*d*, 134*e* may be described as being provided with plural sets of four game symbols, the sets displayed along the reels with each set arranged around a reel. The overall effect is that game symbols are displayed both along and around the reels.

Figure 9A:
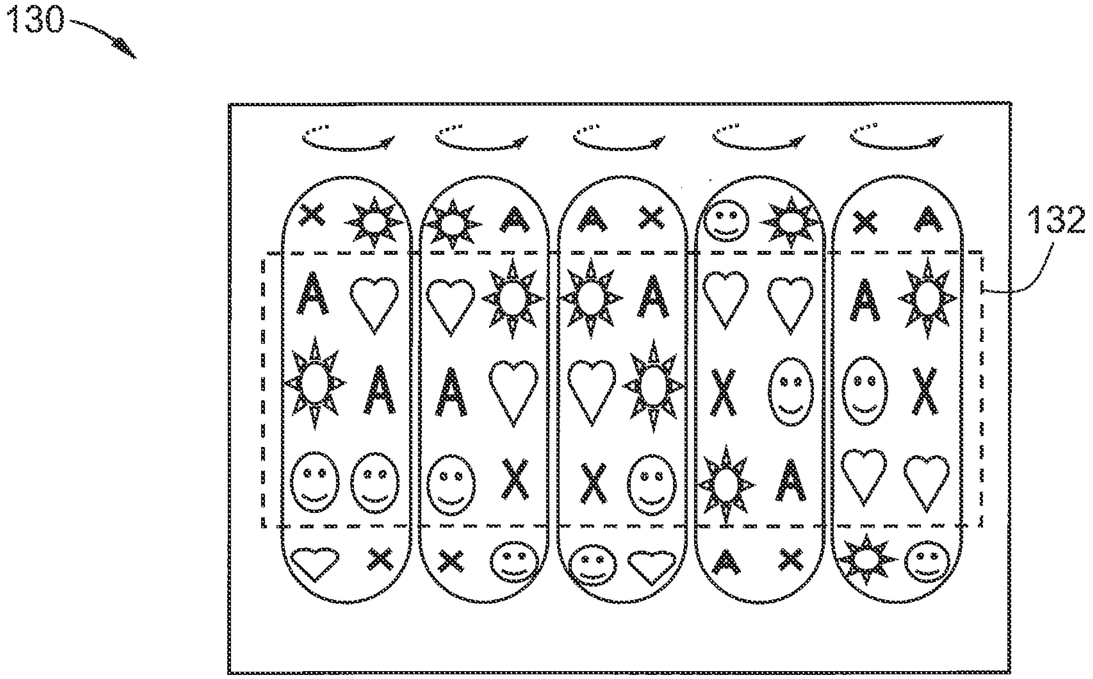

The game play instructions stored in memory 24 also control reels 134*a*, 134*b*, 134*c*, 134*d*, 134*e* to spin or "rotate" (as seen by the player) from left to right in the view of FIG. 6. This progressively brings into view other game symbols, and a new selection of game symbols is completely displayed once the reels have rotated through 90°. This process is illustrated by reference to FIGS. 9A and 9B. Referring to FIG. 9A, after reels 134*a*, 134*b*, 134*c*, 134*d*, 134*e* have rotated through 45°, the original selection and a new selection of game symbols are both partially visible and, referring to FIG. 9B, after reels 134*a*, 134*b*, 134*c*, 134*d*, 134*e* have rotated through a total of 90°, the original selection of symbols has been entirely replaced in the viewable region 132 by the new selection of game symbols. A sequence of such rotations results in what was originally an outer face of reels 134*a*, 134*b*, 134*c*, 134*d*, 134*e* becoming an inner face, and vice versa.

It should be noted that, although in this embodiment in the configuration of FIG. 6 the four game symbols at each vertical position (one displayed and three at the same position along a reel but not displayed) are at the same vertical position, in other embodiments this may not be so. For example, game symbols may be arranged around a reel in a generally helical manner.

The disposition of game symbols on reels 134*a*, 134*b*, 134*c*, 134*d*, 134*e* as displayed before this latter rotation is shown schematically in FIGS. 10A to 10E (corresponding to the reels notionally being viewed in direction 138 in FIG. 6). The player normally views reels 134*a*, 134*b*, 134*c*, 134*d*, 134*e* in direction 162, so the game symbols shown in FIGS. 10A to 10E are not in fact displayed in the configuration of these figures (which, indeed, corresponds to that of FIG. 6). The symbols shown in FIGS. 10A to 10E to the right of centre-lines 164 of each reel are those that are displayed once reels 134*a*, 134*b*, 134*c*, 134*d*, 134*e* have rotated 90° (viz. the configuration shown in FIG. 9B).

Figure 8:
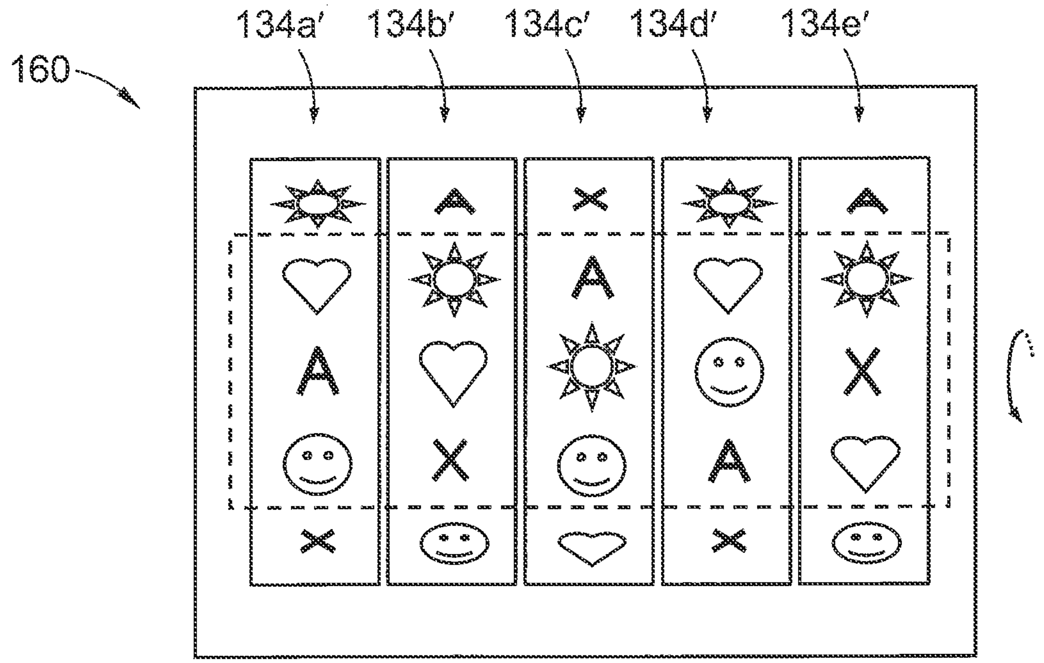
FIG. 8 is a schematic diagram of the visual display of a gaming system according to another embodiment of the invention, with three dimensional reels of toroidal form and square cross section.

In play, reels 134*a*, 134*b*, 134*c*, 134*d*, 134*e* may be controlled to spin from top to bottom and to rotate from right to left simultaneously or sequentially; indeed, this motion may be in the opposite directions to those illustrated, or multiple directions in the course of one game. Reels 134*a*, 134*b*, 134*c*, 134*d*, 134*e* may spin in different directions, such as with all reels 134*a*, 134*b*, 134*c*, 134*d*, 134*e* spinning from top to bottom (as shown in FIG. 6), some rotating from left to right (as shown in FIGS. 8A and 8B) and the others rotating from right to left. In one particular embodiment, reels 134*a*, 134*b*, 134*c*, 134*d*, 134*e* initially spin from top to bottom and rotate from left to right simultaneously, but cease rotating—with a column of game symbols aligned centrally in each reel as viewed by the player (such as is shown in FIGS. 6, 8 and 9B)—before ceasing to spin from top to bottom. The spinning from top to bottom is then controlled to stop such that a pay line is visible to the player. The ceasing of left to right rotation before top to bottom spinning heightens the player's experience, as it can lead to the appearance of an apparent near miss. The time delay between the ceasing of left to right rotation and the ceasing of top to bottom spinning is controlled by the game play instructions in a memory 24, but can be set to any desired period; in one embodiment this period is 3 seconds, but shorter or longer periods may be employed. This period is typically fixed for any particular gaming system according to the present invention, but in some embodiments may be altered during a set of games by the game play instructions, such as on the basis of previous game outcomes, or randomly.

Figure 11:
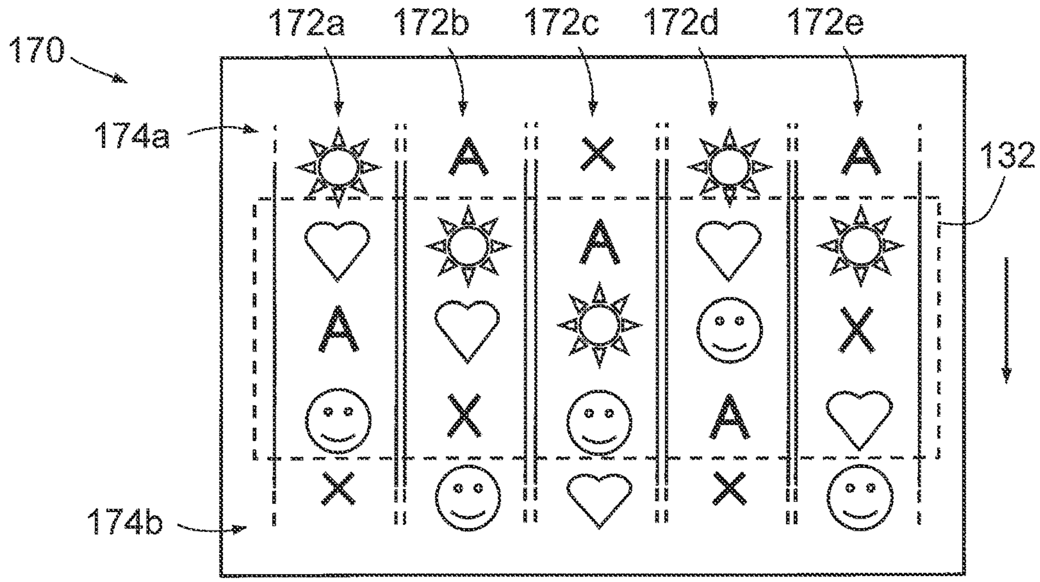
FIG. 11 is a schematic diagram of the visual display of a gaming system according to another embodiment of the invention, with three dimensional reels of tubular form.
Figure 12A:
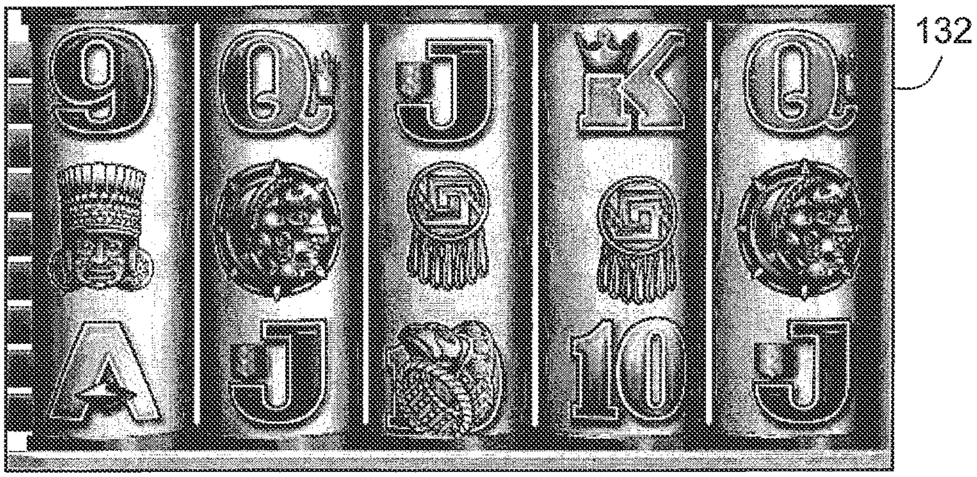
FIGS. 12A to 12C are views of the viewable area of the visual display of a gaming system according to the embodiment of FIG. 11, with three dimensional reels of tubular form, shown in various configurations.
Figure 12B:
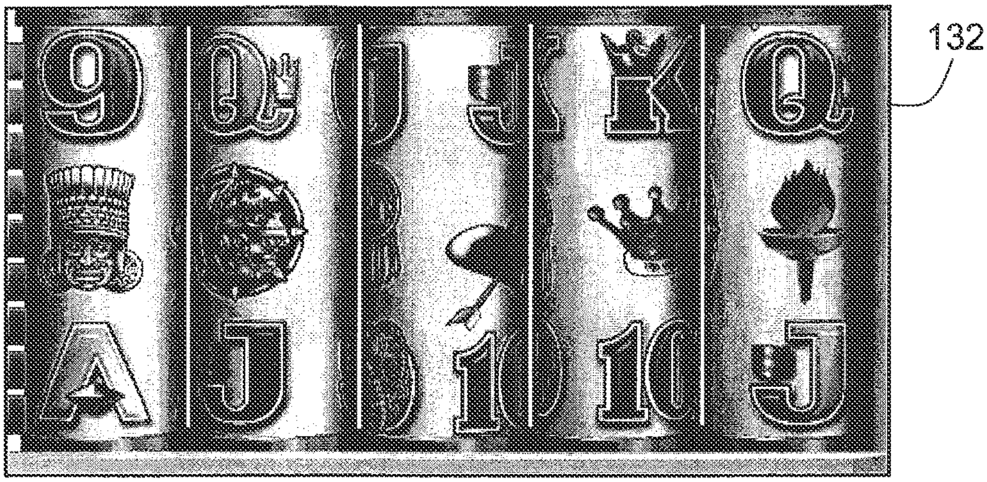
Figure 12C:
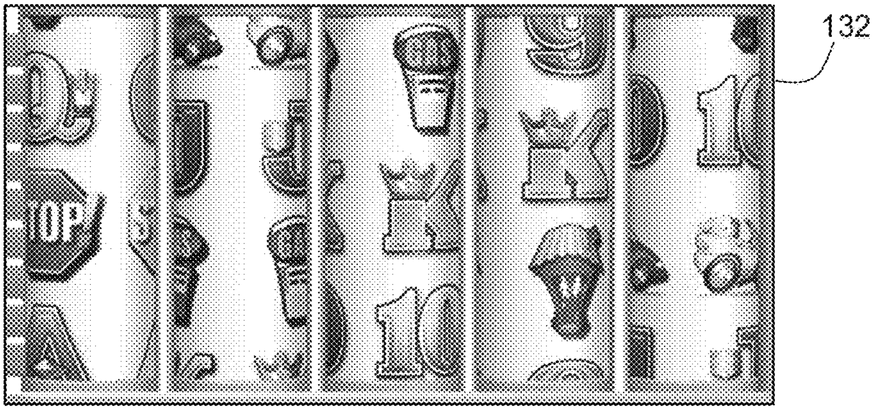

Although it may be preferred to display the reels as toroidal (as shown in FIGS. 6 and 8 to 9B), in some embodiments the reels are displayed as essentially straight three-dimensional figures, such as cylinders, tubes or rods (or, for example, square cross section). FIG. 11 is a schematic view of visual display 170 according to such an embodiment, with reels 172*a*, 172*b*, 172*c*, 172*d*, 172*e* each in the form of a tube. The reels are rendered to appear to comprise straight tubes, so there is no foreshortening of game symbols towards their upper and lower peripheries 174*a*, 174*b*. FIGS. 12A to 12C depict viewable region 132 with possible reels according to such an embodiment, in successive positions. In FIGS. 12A and 12B the reels are shown rotationally displaced relative to each other, illustrating the effect of the rotation of game symbols. FIG. 12C depicts the effect on game symbols once spinning is added, and hence combined with rotational movement: the game symbols are no longer in ranks either vertically or horizontal, producing a novel game experience.

In certain embodiments, the reels are displayed as having more complex shapes; they may be displayed as bent or curved, or forming S shape, a U shape or otherwise. In addition, in some embodiments, some or all of the reels are displayed as joined to one another. For example, an S shaped reel may be displayed as joined to another S shaped reel or to, for example, a U shaped reel.

As is described above, in the embodiment of FIG. 6, the reels stop with a column of game symbols aligned centrally in each reel as viewed by the player. In some embodiments, however, one or more reels may have stop positions in which more than one game symbol displayed as arranged around the reel is displayed to the player, and the game outcome may—in such embodiments—take game symbols in this manner into account. Hence, a game outcome may be determined from more than two rotating symbols on at least one reel. For example, if a reel is of square or regular hexagonal cross section, the reel's stop position may display two or three game symbols, and these—in some embodiments—may influence the game outcome.

Figure 13:
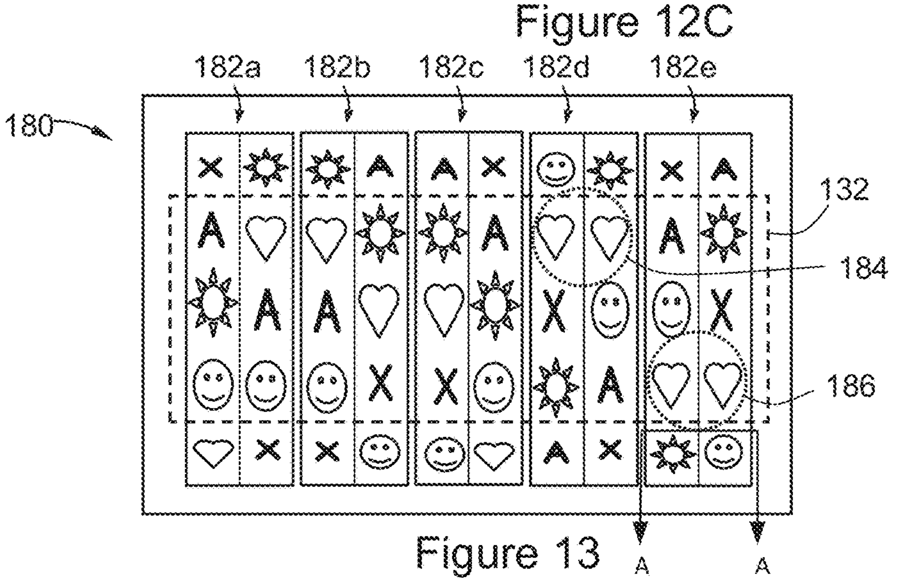
FIG. 13 is a schematic diagram of the visual display of a gaming system according to another embodiment of the invention, with toroidal reels of square cross section and stop positions in which more than one game symbol is displayed around each reel.
Figure 13A:
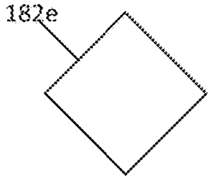
FIG. 13A illustrates a section taken along A-A line on a reel of FIG. 13.

FIG. 13 is a schematic view of visual display 180 according to such an embodiment, with reels 182*a*, 182*b*, 182*c*, 182*d*, 182*e* each in the form of a torus of square cross section. Reels 182*a*, 182*b*, 182*c*, 182*d*, 182*e* have plural possible stop positions, including those shown in FIG. 8. However, FIG. 13 depicts alternative stop positions in which two game symbols are displayed at each position along each reel. More complex game outcome determinations can then be made; for example, a bonus may be awarded if two identical symbols are visible (in viewable region 132) at the same location along one or more reels. This is so in the illustrated example: two pairs of hearts 184, 186 are displayed, on fourth reel 182*d* and on fifth reel 182*e* respectively. A single game may include a mixture of stop positions, with one or more reels stopping with a single column of displayed symbols (cf. FIG. 9B) and one or more other reels stopping with plural columns of displayed symbols (cf. FIG. 12).

Numerous variations are possible according to the present invention. For example, in the above embodiments, the reels are displayed as essentially opaque, with game symbols displayed on the outside of the reels. In some other embodiments, the reels are displayed as transparent or partially transparent, so that additional effects and features can be provided.

For example, a reel may be displayed as transparent and filled or partially filled with a fluid that is displayed to behave, for example, like water. The extent of this filling can be varied with time or according to other parameters, with the degree of filling used to determine additional prizes, bonuses or games features. The filling can also be provided by other than fluids; for example, the reels may be progressively displayed as filled—partially or completely—with balls or other objects.

Figure 14:
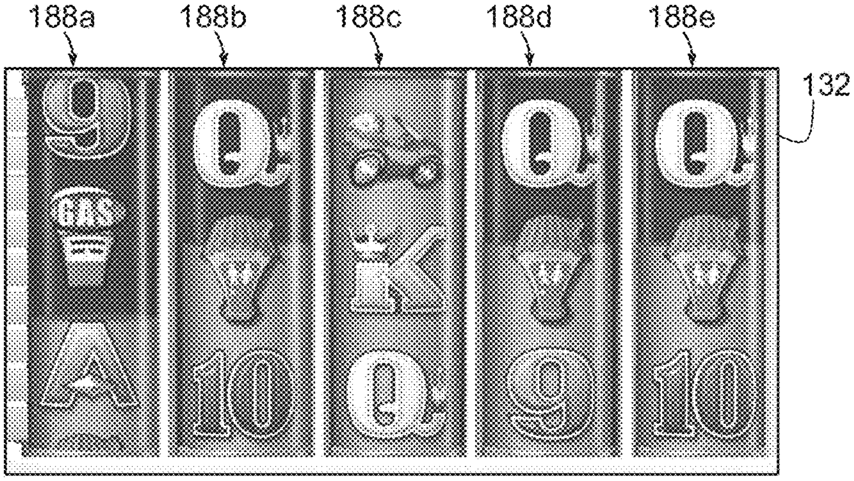
FIG. 14 is a schematic diagram of the visual display of a gaming system according to another embodiment of the invention, with three dimensional transparent reels of tubular form that are displayed as progressively filling to various levels.

An example of such an embodiment is shown in FIG. 14, which depicts viewable region 132 with possible reels—and various "water" levels. From left to right, first to fifth reels 188*a* to 188*e* are provided with game symbols along their vertical length (as are depicted) and around their circumference (concealed in this view), and are displayed as essentially transparent. Each is displayed as filled to varying levels with "water". First reel 188*a* is partially filled, such that only one visible game symbol is backed by the water. Third reel 188*c* is full, and second, fourth and fifth reels 188*b*, 188*d* and 188*e* are displayed as half full.

These final levels of the water can be used, in this embodiment, to determine game or prize outcomes. For example, in one game three like symbols (e.g. buildings) may in their stop positions be located on the centre line of the first three reels (e.g. reels 188*a*, 188*b*, 188*c*). "Water" is then displayed as flowing down into all five reels and settling to varying levels, such as to the bottom position of the first reel 188*a*, the top position of the second and fourth reels 188*b*, 188*d* and to the centre position of the third and fifth reels 188*c*, 188*e*. The prize is evaluated with reference to these "water" levels: the water is behind two of the kings (i.e. in the second and fourth reels), so the prize is doubled and doubled again. Eligibility for the "water" feature can be based on any suitable criterion or criteria, such as would be appreciated by those in the art, such as by being purchased by a special bet, made available in all games, made available only during features, or made available to players with a player card status.

In another example in which the reels are transparent or partially so, game symbols are displayed as falling down (or floating up) inside a reel or reels, and coming to rest at different locations to thereby contribute to prize evaluation. The game symbols can be in a variety of forms. For example, the symbols may be in the form of indicia on objects (such as balls or stars), or comprise those objects (such as a letter-shaped object or a star-shaped object). In either case, a "star"—for example—may be displayed as falling inside a reel and stopping, such as behind one or more game symbols on the reel. Prizes are then evaluated and may pay additional value if such a symbol is behind or otherwise aligned in a predefined manner with one of the game symbols on the reel.

In such embodiments, the falling symbols may be stopped either randomly or in response to some player intervention or skill. Similarly, in the embodiments in which a fluid is displayed as filling one or more reels, players may be provided with the ability to intervene to enhance, inhibit or stop the filling.

In certain embodiments, the falling symbols or filling fluid may constitute an essentially separate game, though played simultaneously with the spinning and rotating reel game. For example, falling game symbols in the reels may comprise keno balls, their stop positions determining the outcome of a keno game.

Also, the falling (or floating) symbols or filling fluid, in some embodiments, trigger features, such as jackpots.

It will also be appreciated that other features known in electronic gaming machines and the games provided thereby can be advantageously and synergistically combined with the features described above.

Figure 15:
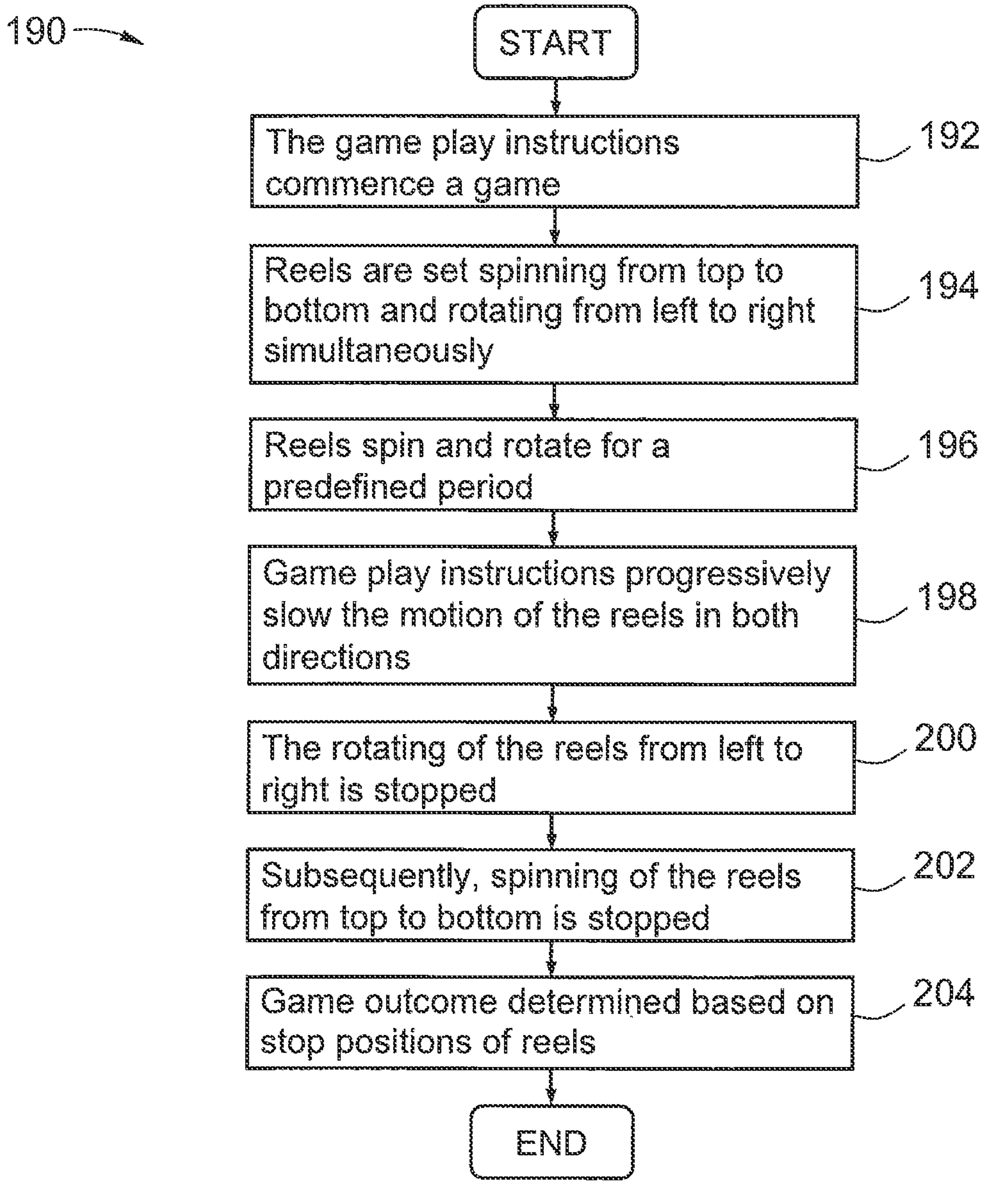
FIG. 15 is a flowchart of a method of an embodiment of the invention.

The basic method 190 of the above embodiments of the invention is summarised in FIG. 15. At step 192, the game play instructions commence a game, typically including receiving input from the random number generator for use in determining the conduct of the game. At step 194, the reels are spinning from top to bottom and rotating from left to right simultaneously. This may create the illusion that the game symbols are moving diagonally.

At step 196, the reels spin and rotate for a predefined period. At step 198, the game play instructions progressively slow the motion of the reels in both directions. At step 200, the rotating of the reels from left to right is stopped. Subsequently, at step 202, the spin of the reels from top to bottom is stopped.

At step 204, the game outcome is determined based on the stop positions of the symbols, as finally displayed to the player.

Modifications and variations as would be apparent to a skilled addressee are deemed to be within the scope of the present invention. For example, the reels may have different cross sections, such that—for example—reels of circular cross section are mixed with reels of square, triangular, pentagonal or other cross section. In addition, the number of symbols spaced around the periphery of the reels may differ from the four described above. For example, if the reels have hexagonal cross sections, six symbols may be spaced around each reel in each position. In such cases, non-displayed symbols may be partially visible even when the reels have stopped, which can also heighten the player experience. Furthermore, a game may be provided in which one or more three dimensional, torus shaped reels are accompanied by other reels, such as conventional, ribbon shaped reels.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in Australia or any other country.

It is to be understood that, if any prior art is referred to herein, such reference does not constitute an admission that the prior art forms a part of the common general knowledge in the art in any country.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

What is claimed is:

1. A gaming system comprising:

a server; and a client device including a display device and a controller comprising a processor and memory storing a plurality of instructions, which, when executed, cause the processor to at least:

receive from the server a first rotation for a toroidal shaped reel having a plurality of reel positions along a surface of the toroidal shaped reel, based on a random event generated by a random number generator, receive from the server a second rotation along the surface of the toroidal shaped reel and relatively orthogonal to the first rotation, based on the random event, and control the display device to display a portion of the toroidal shaped reel rotating vertically, along the toroidal shaped reel, a plurality of vertically-sequenced symbols located along the toroidal shaped reel based on the first rotation, and rotating horizontally, around the surface of the toroidal shaped reel, a plurality of horizontally-sequenced symbols located around the surface of the toroidal shaped reel at each reel position of the plurality of reel positions based on the second rotation, wherein the toroidal shaped reel comprises a torus with a polygonal cross section.

2. The gaming system of claim 1, and wherein the instructions, when executed, further cause the display device to display at least two horizontally-sequenced symbols for a corresponding one of the vertically-sequenced symbols in an outcome.

3. The gaming system of claim 2, wherein the toroidal shaped reel is a first toroidal shaped reel of a plurality of toroidal shaped reels, and wherein the instructions, when executed, further cause the processor to animate a bonus when two identical horizontally-sequenced symbols are visible adjacently through the display device.

4. The gaming system of claim 1, wherein the toroidal shaped reel is displayed as a cylinder, tube or rod reel.

5. The gaming system of claim 1, wherein the instructions, when executed, further causes the display device to animate all of the plurality of vertically-sequenced symbols to spin, simultaneous or sequentially, from top to bottom and to rotate right to left.

6. The gaming system of claim 1, wherein the instructions, when executed, further causes the processor to control motion of all of the plurality of vertically-sequenced symbols to spin and rotate the plurality of horizontally-sequenced symbols in multiple directions.

7. A method of operating in a gaming system including a server and a client device, the method comprising:

receiving from the server a first rotation for a toroidal shaped reel based on a random event generated by a random number generator;

receiving from the server a second rotation of the toroidal shaped reel and relatively orthogonal to the first rotation, based on the random event;

animating at the client device the toroidal shaped reel rotating vertically, along the toroidal shaped reel, all of a plurality of vertically-sequenced symbols located along the toroidal shaped reel based on the first rotation, and the toroidal shaped reel rotating horizontally, around the toroidal shaped reel, a plurality of horizontally-sequenced symbols located around the toroidal shaped reel based on the second rotation;

animating at the client device a game outcome selected from the toroidal shaped reel based on the random event; and animating a winning outcome evaluated from the game outcome, and wherein the toroidal shaped reel comprises a torus with a polygonal cross section.

8. The method of claim 7, further comprising controlling the client device to display at least two horizontally-sequenced symbols for a corresponding one of the vertically-sequenced symbols in the game outcome.

9. The method of claim 8, wherein the toroidal shaped reel is a first toroidal shaped reel of a plurality of toroidal shaped reels, further comprising animating a bonus when two identical horizontally-sequenced symbols are visible adjacently at the client device.

10. The method of claim 9, further comprising:

animating at the client device spinning of the first toroidal shaped reel and a second toroidal shaped reel differently and sequentially displaying at least some of the plurality of vertically-sequenced symbols selected; and animating at the client device stopping of the spinning of the first toroidal shaped reel and the second toroidal shaped reel at respective stop positions.

11. The method of claim 10, further comprising rotating the first toroidal shaped reel vertically, and rotating the second toroidal shaped reel horizontally.

12. The method of claim 10, further comprising displaying all of the plurality of horizontally-sequenced symbols as rotating from left to right or from right to left.

13. The method of claim 7, further comprising responsive to receiving one or more messages from the server, animating the toroidal shaped reel rotating vertically and horizontally at the client device.

14. A non-transitory computer-readable medium comprising a plurality of instructions, for conducting a game on gaming system including a server and a client device, the instructions, which, when executed, cause one or more processors to perform the steps of:

controlling the client device to display a toroidal shaped reel rotating vertically, along the toroidal shaped reel, all of a plurality of vertically-sequenced symbols located along the toroidal shaped reel based on a first rotation received from the server, and the toroidal shaped reel rotating horizontally, around a surface of the toroidal shaped reel, a plurality of horizontally-sequenced symbols located around the surface of the toroidal shaped reel based on a second rotation received from the server;

controlling the client device to display a plurality of symbols selected from the toroidal shaped reel based on a random event generated by a random number generator in response to the toroidal shaped reel rotating vertically and horizontally; and controlling the client device to display a winning output evaluated from the plurality of symbols selected for display, and wherein the toroidal shaped reel comprises a torus with a polygonal cross section.

15. The non-transitory computer-readable medium of claim 14, and wherein the instructions, when executed, further cause the client device to perform the step of displaying at least two horizontally-sequenced symbols for a corresponding one of the vertically-sequenced symbols in a game outcome.

16. The non-transitory computer-readable medium of claim 15, wherein the toroidal shaped reel is a first toroidal shaped reel among a plurality of toroidal shaped reels, and wherein the instructions, when executed, further cause the client device to perform the step of displaying animating a bonus when two identical horizontally-sequenced symbols are visible adjacently at the client device.

17. The non-transitory computer-readable medium of claim 16, and wherein the instructions, when executed, further cause the client device to perform the steps of:

animating spinning of the first toroidal shaped reel and a second toroidal shaped reel differently and sequentially displaying at least some of the plurality of vertically-sequenced symbols selected; and animating stopping of the spinning of the first toroidal shaped reel and the second toroidal shaped reel at respective stop positions.

18. The non-transitory computer-readable medium of claim 17, and wherein the instructions, when executed, further cause the client device to perform the step of displaying rotating the first toroidal shaped reel horizontally, and rotating the second toroidal shaped reel horizontally.

19. The non-transitory computer-readable medium of claim 14, and wherein the instructions, when executed, further cause the client device to perform the step of animating all of the plurality of vertically-sequenced symbols to spin, simultaneous or sequentially, from top to bottom and to rotate right to left.

* * * * *